US012391272B2

(12) United States Patent
Wan et al.

(10) Patent No.: US 12,391,272 B2
(45) Date of Patent: Aug. 19, 2025

(54) SYSTEMS AND METHODS FOR FACILITATING USERS TO EXIT FROM A VEHICLE (71) Applicant: Ford Global Technologies, LLC, Dearborn, MI (US)

(72) Inventors: Jian Wan, Novi, MI (US); Christian Von hausen, Duisburg Aldenrade (DE); Kwaku O. Prakah-Asante, Commerce Township, MI (US); Curtis Sai-Hay To, Troy, MI (US)

( * ) Notice: Subject to any disclaimer, the term of this patent is extended or adjusted under 35 U.S.C. 154(b) by 130 days.

(21) Appl. No.: 18/487,104

(22) Filed: Oct. 15, 2023

(65) Prior Publication Data

US 2025/0121844 A1 Apr. 17, 2025

(51) Int. Cl.
*B60Q 1/00* (2006.01)
*B60W 30/095* (2012.01)
*B60W 50/14* (2020.01)

(52) U.S. Cl.
CPC ........ *B60W 50/14* (2013.01); *B60W 30/0956* (2013.01); *B60W 2050/143* (2013.01); *B60W 2050/146* (2013.01); *B60W 2420/403* (2013.01); *B60W 2420/408* (2024.01); *B60W 2554/4044* (2020.02); *B60W 2554/801* (2020.02)

(58) Field of Classification Search
CPC ............ B60W 50/14; B60W 30/0956; B60W 2050/143; B60W 2050/146; B60W 2420/403; B60W 2420/408; B60W 2554/4044; B60W 2554/801
USPC ...................... 340/435, 436, 425.5, 438, 903
See application file for complete search history.

(56) References Cited

U.S. PATENT DOCUMENTS

| 10,059,347 | B2 | 8/2018 | Thieberger-Navon et al. |
| 11,282,016 | B2 | 3/2022 | Kislovskiy et al. |
| 12,179,786 | B2 * | 12/2024 | Tzen ..................... B60W 40/08 |
| 12,240,482 | B2 * | 3/2025 | Banerjee ................ B60Q 1/525 |
| 2020/0082177 | A1 * | 3/2020 | Sabeti .................... G08G 1/166 |
| 2021/0142526 | A1 * | 5/2021 | Mantyjarvi ........... B60W 50/14 |
| 2021/0354625 | A1 * | 11/2021 | ElShenawy ............. E05B 81/56 |
| 2022/0118997 | A1 * | 4/2022 | Paus ..................... B60W 50/14 |
| 2023/0004164 | A1 | 1/2023 | Onofrio et al. |
| 2023/0054771 | A1 | 2/2023 | Brandon et al. |
| 2024/0326863 | A1 * | 10/2024 | Perez Barrera ... B60W 60/0017 |

OTHER PUBLICATIONS

Liam Kettle, et al., Augmented Reality for Vehicle-Driver Communication: A Systematic Review, Safety 2022, 8, 84., Dec. 13, 2022, pp. 1-27.

* cited by examiner

*Primary Examiner* — Anh V La
(74) *Attorney, Agent, or Firm* — Emily Drake; Eversheds Sutherland (US) LLP (57) ABSTRACT A vehicle including a vehicle door, a detection unit and a vehicle processor is disclosed. The detection unit may be configured to detect an object presence in proximity to the vehicle and object information associated with an object. The vehicle processor may be configured to obtain the object information from the detection unit when the detection unit detects the object presence, and determine that the object may be approaching towards the vehicle door based on the object information. The vehicle processor may further output the object information to a user device responsive to determining that the object may be approaching towards the vehicle door.

5 Claims, 5 Drawing Sheets

SYSTEMS AND METHODS FOR FACILITATING USERS TO EXIT FROM A VEHICLE

FIELD

The present disclosure relates to systems and methods for facilitating users to exit from a vehicle.

BACKGROUND

Vehicles typically include rear-view mirrors that facilitate drivers to see if other vehicles, motorists, objects, people, etc. may be in proximity to vehicle rear side. Such mirrors facilitate the drivers to conveniently drive the vehicles and/or exit from the vehicles. For example, a driver may look at a rear-view mirror before exiting the vehicle to ensure that no one is approaching the vehicle from the vehicle rear side.

While the rear-view mirror may assist the driver to conveniently exit from the vehicle, other passengers or occupants in the vehicle may not have a clear view of the vehicle rear side while exiting the vehicle. For example, an occupant sitting in a sitting area behind a driver sitting area may not have access to the rear-view mirror, and hence may not know if someone may be approaching a vehicle door from where the occupant may exit. Furthermore, there may be instances where the driver may miss or forget to look at the rear-view mirror while exiting the vehicle. Such instances may cause inconvenience to the driver and/or the vehicle occupants, especially when another vehicle or motorist may be approaching towards the vehicle door from where the driver/occupants may be exiting.

Therefore, a system is required that may facilitate vehicle users to conveniently exit from a vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle and a user device configured to facilitate vehicle occupants to conveniently exit from the vehicle. The user device may be, for example, Augmented Reality (AR) eyeglasses (or AR glasses) that the vehicle occupants may wear. The vehicle may be configured to detect an object presence in proximity to the vehicle when the object may be approaching towards the vehicle or a vehicle door. For example, the vehicle may be configured to detect that a motorist may be approaching towards a passenger door from a vehicle rear side. Responsive to detecting the motorist presence in proximity to the vehicle, the vehicle may determine object/motorist information. The motorist information may include, for example, a real-time motorist location relative to the vehicle, speed and direction of motorist movement, and/or a motorist image. Responsive to determining the motorist information, the vehicle may transmit the motorist information to the AR glasses (e.g., the AR glasses worn by a passenger sitting adjacent to the passenger door).

The AR glasses may obtain the motorist information and determine a location of a vehicle door towards which the motorist may be approaching, based on the motorist information. For example, the AR glasses may determine a passenger door location in the vehicle towards which the motorist may be approaching based on the motorist information. In some aspects, the AR glasses may determine the passenger door location in an AR or virtual space associated with the AR glasses in a vehicle interior portion.

Responsive to determining the passenger door location, the AR glasses may output the passenger door location so that the passenger may know that the motorist may be approaching towards the passenger door. In this case, the passenger may not open the passenger door till the motorist crosses the passenger door. In this manner, the AR glasses may assist the passenger in conveniently exiting the vehicle, even when the passenger may not see the motorist in passenger's direct line of sight.

In some aspects, the AR glasses may output the passenger door location by overlaying a passenger door digital image on a display screen associated with the AR glasses. The AR glasses may further cause the passenger door digital image to illuminate in a predetermined pattern based on motorist speed and location in proximity to the passenger door, to accordingly alert the passenger. In further aspects, the AR glasses may output the motorist image on the display screen. In additional aspects, the AR glasses may output the passenger door location via an audible signal output from an AR glasses speaker. The AR glasses may further output a haptic feedback to alert the passenger.

The present disclosure discloses a vehicle and a user device that may facilitate vehicle occupants to conveniently exit from the vehicle. The vehicle may transmit the motorist information to the AR glasses even when the vehicle ignition may be switched OFF, thereby enabling the AR glasses to alert the vehicle occupants even when the vehicle's power may be OFF. Further, the vehicle and the user device may enable even those occupants who may be sitting in sitting areas located in a middle row or a back row of the vehicle interior portion to be aware of an approaching object/motorist, thereby enabling their convenient exit from the vehicle.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

Figure 1:
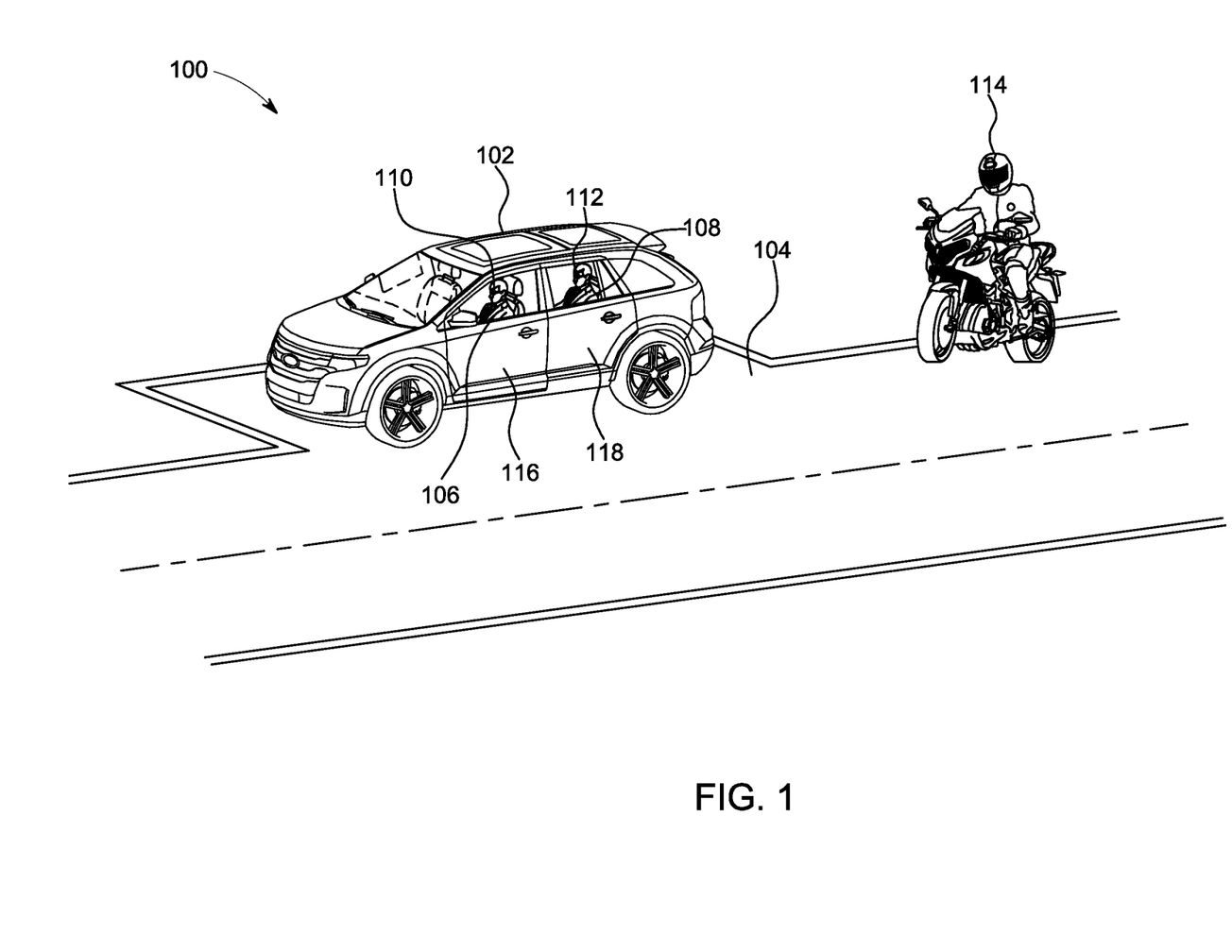
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102 that may be parked (or in a stationary state) on a parking spot 104 on a road. The vehicle 102 may take the form of any passenger or commercial vehicle such as, for example, a car, a work vehicle, a crossover vehicle, a truck, a van, a minivan, a taxi, a bus, etc. The vehicle 102 may be a manually driven vehicle, and/or may be configured to operate in a partially or fully autonomous mode.

In some aspects, one or more occupants may be sitting in the vehicle 102 (e.g., in a vehicle interior portion). For example, as shown in FIG. 1, a driver 106 may be sitting in a driver sitting area and a passenger 108 may be sitting in a sitting area behind the driver sitting area inside the vehicle 102. Example sitting arrangement of the driver 106 and the passenger 108 shown in FIG. 1 should not be construed as limiting. The passenger 108 may be sitting anywhere in the vehicle 102 relative to the driver 106 without departing from the present disclosure scope.

The driver 106 and the passenger 108 may be associated with respective user devices, which may be, for example, mobile phones, tablets, wearable devices such as smartwatches or Augmented Reality (AR) eyeglasses (AR glasses), or any other device with communication capabilities. In the exemplary aspect depicted in FIG. 1, the driver 106 may be wearing driver AR glasses 110 and the passenger 108 may be wearing passenger AR glasses 112. The driver and passenger AR glasses 110, 112 may be configured to communicatively couple with the vehicle 102 (e.g., when the driver 106 and the passenger 108 may be sitting inside the vehicle 102) and may output one or more notifications based on signals/information/data received from the vehicle 102. The driver and passenger AR glasses 110, 112 may output the notifications as AR images overlaid or "augmented" on real-life view of vehicle's surrounding that the driver 106/passenger 108 may be viewing via respective driver and passenger AR glasses 110, 112, or output the notifications as audible and/or haptic signals. A person ordinarily skilled in the art may appreciate that in the driver and passenger AR glasses 110, 112, the glasses themselves act as display screens on which the AR images may be displayed or overlaid as notifications for the wearer (e.g., the driver 106/passenger 108).

The environment 100 may further include a motorist who may be driving a motorbike (collectively referred to as a motorist 114 in the present disclosure) in proximity to the vehicle 102 and approaching towards one or more vehicle doors, e.g., a driver door 116 and/or a passenger door 118. The motorist 114 is illustrated as an example in FIG. 1 and should not be construed as limiting. The motorist 114 may be replaced by any other object or another vehicle that may be located in proximity to the vehicle 102 and approaching towards the driver door 116 and/or the passenger door 118.

In the exemplary aspect depicted in FIG. 1, the motorist 114 may be approaching the driver door 116 and/or the passenger door 118 from a vehicle rear side, and hence the driver 106 and/or the passenger 108 may not be aware of motorist's approach towards respective doors. To make the driver 106 and/or the passenger 108 aware of motorist's approach towards the driver door 116 and/or the passenger door 118, the vehicle 102 may be configured to determine and transmit motorist information (or object information) to the driver and passenger AR glasses 110, 112. The driver and passenger AR glasses 110, 112 may be configured to determine a vehicle door (e.g., the driver door 116 and/or the passenger door 118) towards which the motorist 114 may be approaching based on the motorist information, and output a notification on the driver and/or passenger AR glasses 110, 112 including the location of the determined vehicle door. The notification may further include information associated with the motorist 114, e.g., a motorist type (e.g., whether a car, a bus, a motorbike, etc. may be approaching the vehicle door), motorist's approach speed and/or direction towards the vehicle door, and/or the like. The notification may be output in the form of an AR image overlaid on the display screen of the driver and/or passenger AR glasses 110, 112, and/or an audible signal or a haptic feedback. The driver 106 and/or the passenger 108 may view/hear the notification, and may accordingly open the vehicle door when the motorist 114 may have crossed the vehicle door to conveniently exit from the vehicle 102. In this manner, the vehicle 102 and the driver and/or passenger AR glasses 110, 112 assist the driver 106 and/or the passenger 108 to be aware of the approaching motorist 114, even if the driver 106 and/or the passenger 108 are not able to directly view the motorist 114 in their respective lines of sight.

The motorist information described above may include a motorist image, a motorist speed towards the vehicle 102, a motorist movement direction towards the vehicle 102, a motorist real-time location in proximity to the vehicle 102, and/or the like. In some aspects, the vehicle 102 may determine the motorist information based on inputs obtained from a vehicle detection unit (shown as detection unit 210 in FIG. 2), which may include one or more Radio Detection and Ranging (Radar) sensors, Light Detection and Ranging (lidar) sensors, vehicle cameras, and/or the like. In some aspects, the detection unit may be configured to detect the motorized information described above even when a vehicle ignition associated with the vehicle 102 may be switched OFF or in an "OFF state". Further, the vehicle 102 may be configured to transmit the motorized information to the driver and/or passenger AR glasses 110, 112 even when the vehicle ignition may be switched OFF. In this manner, the driver and/or passenger AR glasses 110, 112 may receive the motorized information and accordingly output the notification for the driver 106 and/or the passenger 108 irrespective of the vehicle operational state.

The details of the vehicle 102, the driver and/or passenger AR glasses 110, 112, and the process of outputting the notification are described below in conjunction with FIG. 2.

The vehicle 102, the driver and passenger AR glasses 110, 112, the driver 106 and the passenger 108 implement and/or perform operations, as described here in the present disclosure, in accordance with the owner manual and safety guidelines. In addition, any action taken by the driver 106 or the passenger 108 should comply with all the rules specific to the location and operation of the vehicle 102 (e.g., Federal, state, country, city, etc.). The notifications or recommendations, as provided by the vehicle 102, and the driver and/or passenger AR glasses 110. 112, should be treated as suggestions and only followed according to any rules specific to the location and operation of the vehicle 102.

Figure 2:
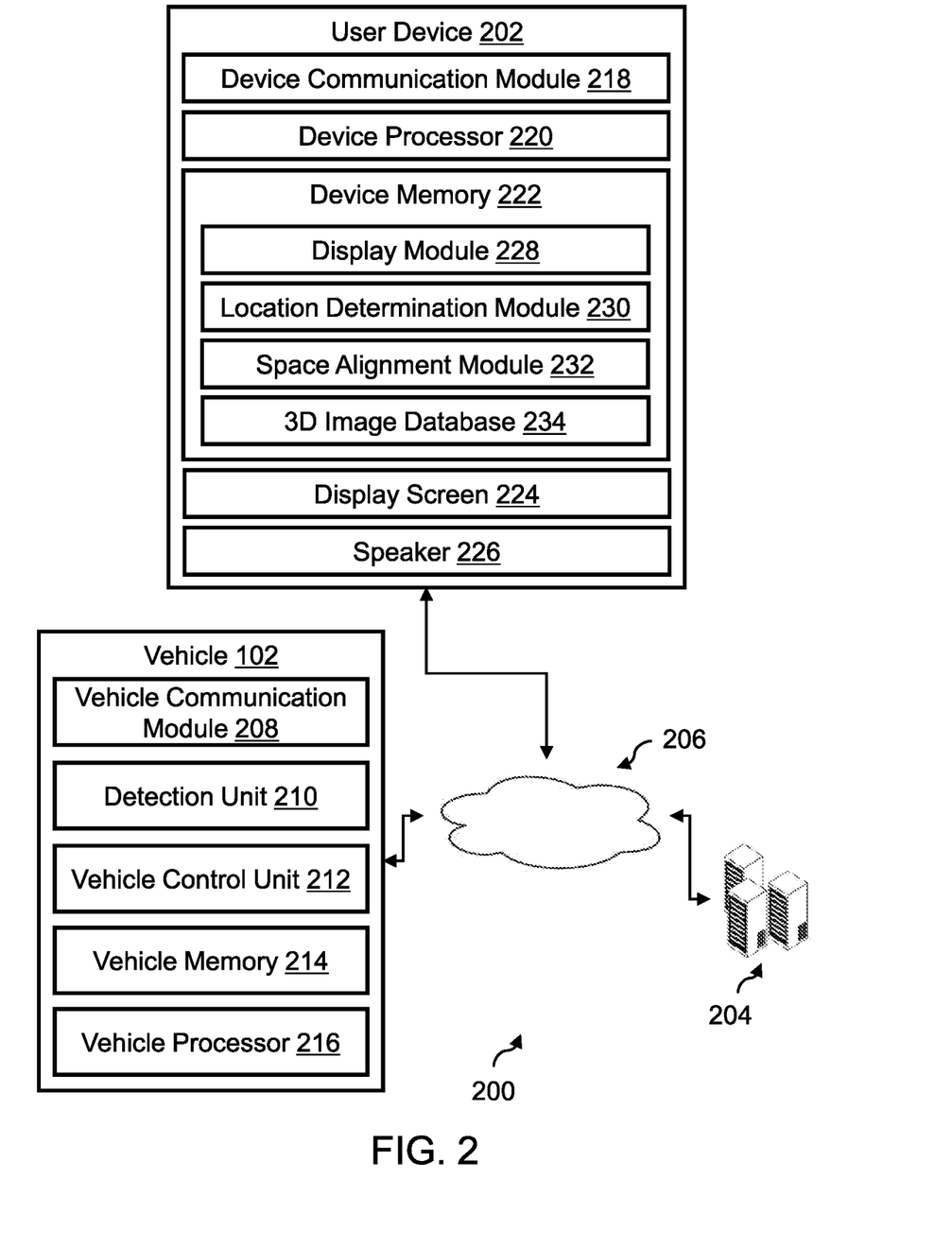
FIG. 2 depicts a block diagram of an example system to facilitate vehicle users to exit from a vehicle in accordance with the present disclosure.

FIG. 2 depicts a block diagram of an example system 200 to facilitate vehicle users (the driver 106 and/or the passenger 108) to exit from the vehicle 102 in accordance with the present disclosure. While describing FIG. 2, references will be made to FIGS. 3 and 4. FIG. 2 is described by taking the passenger 108 as an example or from the context of the passenger 108; however, the same system 200 and the description described below are applicable to the driver 106.

The system 200 may include the vehicle 102, a user device 202, and one or more servers 204 (or server 204) communicatively coupled with each other via one or more networks 206 (or network 206). The user device 202 may a mobile phone, a tablet, a wearable device such as a smartwatch or Augmented Reality (AR) eyeglasses (AR glasses), or any other device with communication capabilities associated with the passenger 108. For the sake of the description of FIG. 2, the user device 202 is assumed to be the passenger AR glasses 112 associated with the passenger 108.

The server 204 may be part of a cloud-based computing infrastructure and may be associated with and/or include a Telematics Service Delivery Network (SDN) that provides digital data services to the vehicle 102 and other vehicles (not shown in FIG. 2) that may be part of the vehicle fleet. In further aspects, the server 204 may be configured to store 3-Dimensional (3D) digital images of vehicle interior portions associated with a plurality of vehicles (including a 3D digital image of a vehicle interior portion associated with the vehicle 102), and a plurality of digital images (or "digital twins") associated with a plurality of vehicle components as visible from the vehicle interior portions. For example, the server 204 may store digital images of the driver door 116, the passenger door 118, and other vehicle doors/components as visible from the vehicle interior portion associated with the vehicle 102. The server 204 may be configured to transmit, via the network 206, the 3D digital image of the vehicle interior portion associated with the vehicle 102 (or vehicle interior portion 3D image) and the vehicle component digital images (e.g., vehicle door digital images) to the user device 202 at a predefined frequency or when the user device 202 transmits a request to the server 204 to obtain the 3D/digital images described above.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units/modules including, but not limited to, a vehicle communication module 208, a detection unit 210 (or a "situation sensing" unit), a vehicle control unit (VCU) 212, a vehicle memory 214, and a vehicle processor 216 (or a "situation determination" unit), which may be communicatively coupled with each other. The vehicle communication module 208 may be configured to communicatively pair or couple the vehicle 102 with one or more external devices or systems, e.g., the user device 202 via the network 206. The vehicle communication module 208 may be additionally configured to receive/transmit data/information/signals from/to external systems and devices via the network 206. For example, the vehicle communication module 208 may transmit or receive information/signals to/from the user device 202 and/or the server 204. The vehicle communication module 208 may be further configured to transmit/receive signals/information to/from the vehicle units described above.

The detection unit 210 may include a plurality of vehicle sensors including, but not limited to, Radio Detection and Ranging (Radar) sensors, Light Detection and Ranging (lidar) sensors, vehicle interior and exterior cameras, and/or the like. The detection unit 210 may be configured to detect an object presence (i.e., presence of an object such as the motorist 114) in proximity to the vehicle 102 and object information (or the motorist information, as described above in conjunction with FIG. 1) associated with the detected object. The object information may include, but is not limited to, object location in proximity to the vehicle 102, an object movement speed, an object movement direction, and an object image. For example, the detection unit 210 may be configured to detect a real-time motorist location relative to the vehicle 102 when the motorist 114 may be approaching towards the vehicle 102 (e.g., towards the passenger door 118), the approach speed and direction associated with the motorist 114 relative to the vehicle 102/passenger door 118, and the motorist image as the motorist 114 approaches the vehicle 102. As described above in conjunction with FIG. 1, the motorist 114 may be approaching the vehicle 102 from the vehicle rear side.

The VCU 212 may include a plurality of Electronic Control Units (ECUs, not shown) that may enable the VCU 212 to control vehicle operational aspects and implement one or more instruction sets received from the server 204 and/or the vehicle processor 216. In some aspects, the VCU 212 may be configured to determine an operation or movement state associated with the vehicle 102. For example, the VCU 212 may be configured to determine whether the vehicle 102 may be in motion, stationary, in a park drive mode and/or whether the vehicle ignition may be switched OFF.

The vehicle processor 216 may utilize the vehicle memory 214 to store programs in code and/or to store data for performing operations in accordance with the present disclosure. The vehicle memory 214 may be a non-transitory computer-readable storage medium or memory storing the program codes that may enable the vehicle processor 216 to perform operations in accordance with the present disclosure. The vehicle memory 214 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The user device 202 may include a plurality of units/modules including, but not limited to, a device communication module 218, a device processor 220, a device memory 222, a display screen 224 and a speaker 226, communicatively coupled with each other. The device communication module 218 may be configured to communicatively pair or couple the user device 202 with one or more external devices or systems, e.g., the vehicle 102 via the network 206. In an exemplary aspect, the device communication module 218 may be configured to communicatively couple with the vehicle 102 when the user device 202 may be disposed within a predefined distance of the vehicle 102. For example, when the user device 202 is the passenger AR glasses 112, the device communication module 218 may communicatively couple the user device 202 with the vehicle 102 when the passenger 108 may be sitting inside the vehicle 102 wearing the passenger AR glasses 112, or the user device 202 may be located in the vehicle interior portion.

In some aspects, the vehicle communication module 208 and the device communication module 218 may enable pairing or coupling of the vehicle 102 and the user device 202 by exchanging predefined identifiers (e.g., vehicle and/or user device identifiers) and/or authentication codes that may be pre-stored in the vehicle memory 214 and the device memory 222. The vehicle communication module 208 and the device communication module 218 pairs or couples the vehicle 102 and the user device 202 using known pairing technologies, and hence are not described here in detail.

As described above in conjunction with FIG. 1, when the user device 202 is the passenger AR glasses 112, the display screen 224 may be the transparent glasses of the passenger AR glasses 112 through which the passenger 108 may view real-life objects (e.g., vehicle components or real-life objects located in proximity to the vehicle 102) or on which one or more AR images (or notifications) may be displayed for the passenger 108. The speaker 226 may be configured to audibly output messages or notifications (e.g., notifications received from the vehicle 102, the server 204 and/or the device processor 220).

The device processor 220 may utilize the device memory 222 to store programs in code and/or to store data for performing operations in accordance with the present disclosure. The device memory 222 may be a non-transitory computer-readable storage medium or memory storing the program codes that may enable the device processor 220 to perform operation in accordance with the present disclosure. The device memory 222 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the device memory 222 may include a plurality of modules and databases including, but not limited to, a display module 228, a location determination module 230, a space alignment module 232 and a 3D image database 234. The 3D image database 234 may be configured to store the vehicle interior portion 3D image(s) associated with the vehicle 102 and the vehicle component digital images (or the vehicle door digital images) that the user device 202 may receive, via the device communication module 218, from the server 204, as described above.

The display module 228, the location determination module 230 and the space alignment module 232, as described herein, may be stored in the form of computer-executable instructions, and the device processor 220 may be configured and/or programmed to execute the stored computer-executable instructions for performing operations in accordance with the present disclosure.

In operation, when the passenger 108 enters the vehicle 102 or may be sitting inside the vehicle 102 wearing the user device 202/passenger AR glasses 112, the device communication module 218 and the vehicle communication module 208 may pair with each other to enable pairing/coupling of the user device 202 and the vehicle 102. Responsive to the user device 202 and the vehicle 102 coupling with each other, the device processor 220 may execute instructions stored in the space alignment module 232 to "align" a user device coordinate system (i.e., a coordinate system in an AR space associated with the passenger AR glasses 112) with a vehicle interior portion coordinate system. In this case, responsive to the user device 202 and the vehicle 102 coupling with each other, the device processor 220 may first obtain the vehicle interior portion 3D image(s) associated with the vehicle 102 from the 3D image database 234 and align the respective coordinate systems of the user device 202 and the vehicle interior portion based on the vehicle interior portion 3D image(s).

In some aspects, the device processor 220 may align the coordinate systems described above by using an image marker having a fixed relationship with the vehicle interior portion. For example, the device processor 220 may transmit a visual and/or audible request, e.g., via the speaker 226, to the passenger 108 to look at a fixed point (e.g., a vehicle steering wheel, a vehicle infotainment system, etc.) in the vehicle interior portion. When the passenger 108 looks at the fixed point through the user device 202, the device processor 220 may determine a user device line of sight and may correlate the user device line of sight with the vehicle interior portion 3D image(s) obtained from the 3D image database 234 to align the coordinate systems associated with the user device 202 and the vehicle 102. For example, by using the user device line of sight, the device processor 220 may determine where in the user device line of sight are different vehicle components (e.g., the vehicle steering wheel, the vehicle infotainment system, the passenger door 118, and/or the like) located. Based on such determination and the vehicle interior portion 3D image(s), the device processor 220 may align coordinate systems associated with the user device 202 and the vehicle interior portion. In some aspects, the device processor 220 may align the coordinate systems to determine a user device location within the vehicle interior portion where the user device 202 may be located (and hence where the passenger 108 may be sitting). For example, based on the alignment described above, the device processor 220 may determine that the user device 202 (and hence the passenger 108) may be located in the sitting area behind the driving sitting area, as shown in FIG. 1 (or adjacent to the passenger door 118).

In other aspects, the device processor 220 may align the coordinate systems described above by using known algorithms or methods such as simultaneous localization and mapping (SLAM) method/algorithm (that may be pre-stored in the space alignment module 232). By using the SLAM method, the device processor 220 may match the user device coordinate system with the vehicle interior portion's geometry, as described above.

In further aspects, responsive to the user device 202 and the vehicle 102 pairing/coupling with each other, the vehicle processor 216 may obtain the object information (or the motorist information, as described above) from the detection unit 210. In some aspects, the vehicle processor 216 may obtain the object information from the detection unit 210 when the detection unit 210 detects the object presence (or the motorist presence) in proximity to the vehicle 102. In further aspects, the vehicle processor 216 may obtain the object information from the detection unit 210 when the vehicle 102 may be stationary or parked, and/or when the vehicle ignition may be switched OFF or in the OFF state. The vehicle processor 216 may determine vehicle's operational or movement state (i.e., whether the vehicle 102 may be in motion or stationary, in a park drive mode and/or whether the vehicle ignition may be switched OFF) based on inputs obtained from the VCU 212.

Responsive to obtaining the object information, the vehicle processor 216 may determine that the object/motorist 114 may be approaching towards a vehicle door (e.g., the passenger door 118) based on the object information. For example, the vehicle processor 216 may determine that the motorist 114 may be approaching towards the passenger door 118 from the vehicle rear side based on the motorist location in proximity to the vehicle 102, and/or motorist's speed and direction of movement relative to the vehicle 102. Responsive to determining that the object may be approaching towards the passenger door 118, the vehicle processor 216 may output/transmit, via the vehicle communication module 208, the object information to the user device 202 (specifically to the device communication module 218) via the network 206.

The device communication module 218 may receive the object information from the vehicle communication module 208 and may transmit the received object information to the device processor 220. The device processor 220 may obtain the object information from the device communication module 218 and may execute the instructions stored in the location determination module 230 to determine a vehicle door location associated with the vehicle door (towards which the object may be approaching) in the vehicle interior portion based on the obtained object information. For example, based on the motorist image and/or direction and speed of motorist movement, the device processor 220 may determine that the motorist 114 may be approaching towards the passenger door 118. Responsive to determining that the motorist 114 may be approaching the passenger door 118, the device processor 220 may determine a "passenger door location" in the AR space associated with the user device 202/passenger AR glasses 112 based on the vehicle interior portion 3D image and the user device location in the vehicle interior portion (that the device processor 220 determines while aligning the coordinate systems associated with the user device 202 and the vehicle interior portion, as described above).

Responsive to determining the passenger door location, the device processor 220 may output the passenger door location to indicate to the passenger 108 that the object/motorist 114 may be approaching the passenger door 118 (and hence the passenger 108 should not open the passenger door 118 to exit the vehicle 102). In some aspects, the device processor 220 may output the passenger door location via an audible signal output from the speaker 226. For example, the device processor 220 may output an audible signal stating, "A motorist is approaching from behind. Do not open your door", from the speaker 226 to enable the passenger 108 to hear the signal and not open the passenger door 118 till the object/motorist 114 crosses the passenger door 118. In this manner, the device processor 220 may enable the passenger 108 to know about the motorist approach towards the passenger door 118, even when the motorist 114 may not be in line of sight of the passenger 108.

Figure 3:
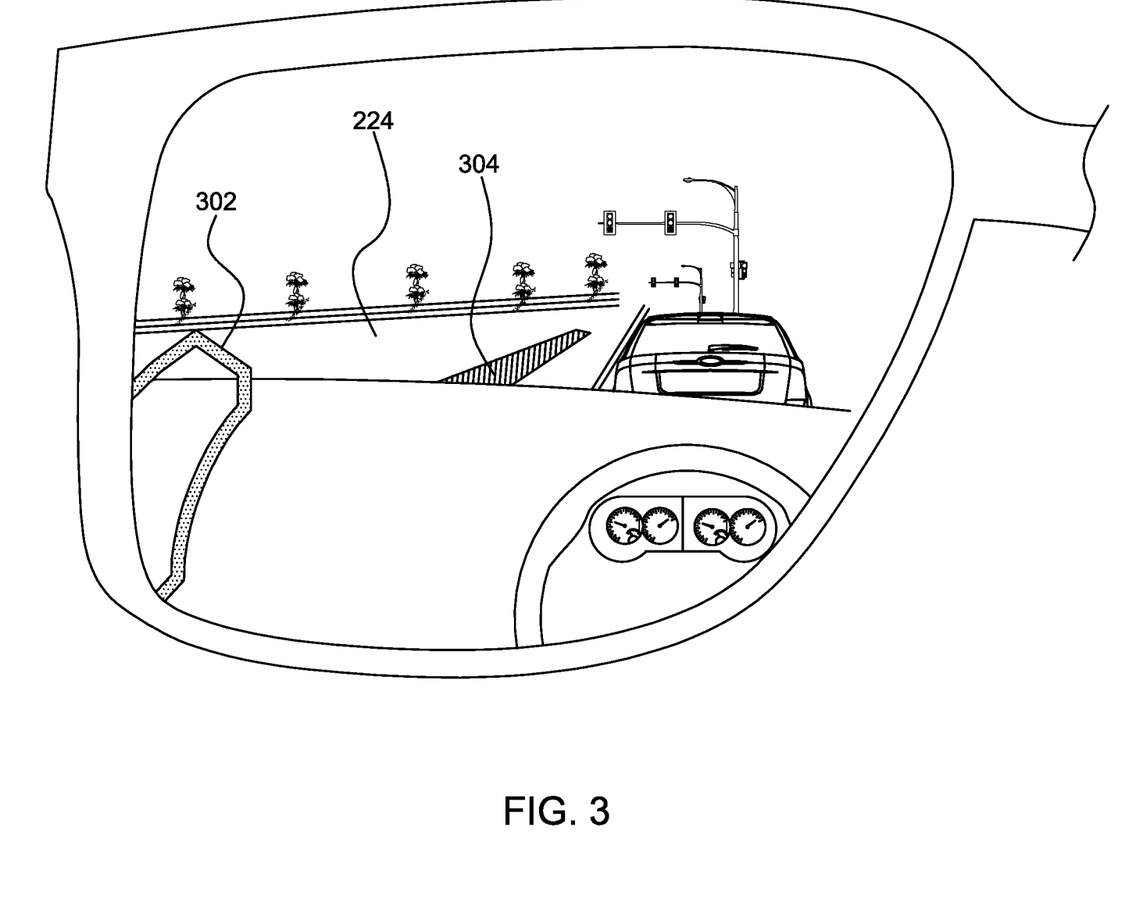
FIG. 3 depicts a first example display from Augmented Reality (AR) eyeglasses in accordance with the present disclosure.

In further aspects, the device processor 220 may execute the instructions stored in the display module 228 and output the passenger door location on the display screen 224. In an exemplary aspect, the device processor 220 may output the passenger door location on the display screen 224 by overlaying the passenger door digital image (that the device processor 220 may obtain from the 3D image database 234) on the display screen 224 based on the user device location in the vehicle interior portion and the passenger door location. For example, when the user device location may be the sitting area behind the driver sitting area and the object/motorist 114 may be approaching towards the passenger door 118, the device processor 220 may determine that the passenger door 118 may be located towards a left side corner of the display screen 224 when the passenger 108 may be viewing through the user device 202/passenger AR glasses 112, and may accordingly overlay a passenger door digital image 302 towards the left side corner of the display screen 224, as shown in FIG. 3. Since the coordinate systems associated with the user device 202 and the vehicle interior portion are aligned, the passenger door digital image 302 may be overlaid at an "actual" position where the physical passenger door 118 may be located in the vehicle interior portion. In an exemplary aspect, the passenger door digital image 302 may have same shape and size as the physical passenger door 118.

In some aspects, the device processor 220 may additionally cause the passenger door digital image 302 to illuminate in a predefined pattern based on the object information. For example, if the object may be travelling at a high speed towards the passenger door 118 or may be very near to (or within a predefined threshold distance from) the passenger door 118, the device processor 220 may cause the passenger door digital image 302 to illuminate and flash at a predefined frequency to inform/alert the passenger 108 about the approaching object. As another example, based on the distance from the passenger door 118 and/or the approach speed, the device processor 220 may cause the passenger door digital image 302 to illuminate in red, yellow or green colors (or any other predetermined colors). In further aspects, the device processor 220 may overlay an indicator 304 on the display screen 224 indicating object/motorist's direction of movement to the passenger 108, as shown in FIG. 3.

Figure 4:
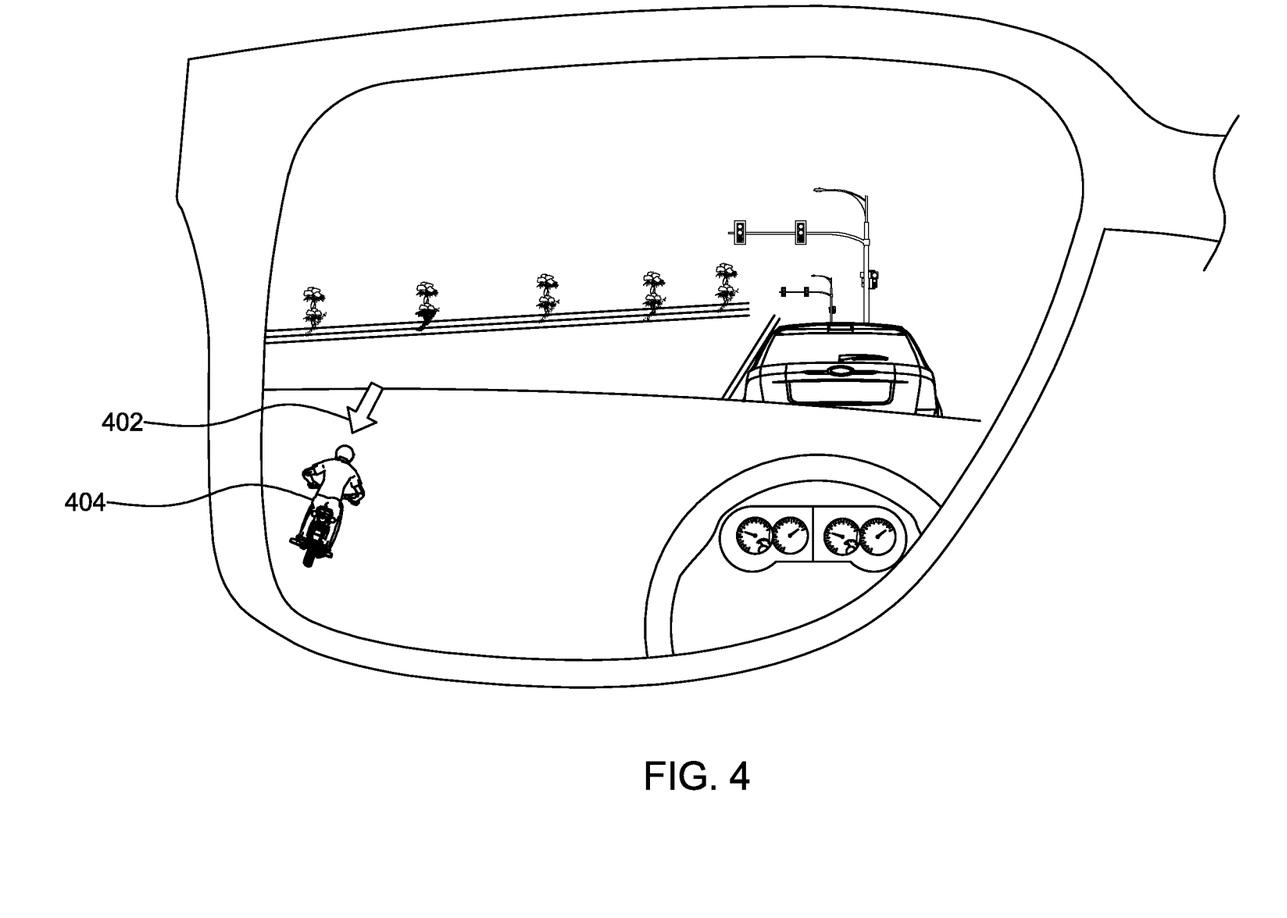
FIG. 4 depicts a second example display from Augmented Reality (AR) eyeglasses in accordance with the present disclosure.

FIG. 3 depicts just one example aspect or way of outputting the passenger door location on the display screen 224. In other aspects, the device processor 220 may overlay another type of indicator (e.g., an arrow 402, as shown in FIG. 4) on the display screen 224 to indicate the passenger door location to the passenger 108. In further aspects, the device processor 220 may overlay an object/motorist image 404 (that may be part of the object information obtained from the vehicle 102) on the display screen 224, as shown in FIG. 4. In yet another aspect, the device processor 220 may overlay a graphical representation of the motorist 114 on the display screen 224. In this case as well, the arrow 402, the object image 404 and/or the graphical representation may illuminate in a predefined pattern and/or color based on the object information. In some aspects, the device processor 220 may further increase or decrease the size of the arrow 402/object image 404 based on the object's distance from the passenger door 118 and/or the object's approach speed. The device processor 220 may further output haptic feedback or vibration based on the object's distance from the passenger door 118 and/or the object's approach speed.

Since the coordinate systems associated with the user device 202 and the vehicle interior portion are aligned, only "relevant" occupants in the vehicle interior portion may receive or view the passenger door location. For example, an occupant sitting adjacent to the passenger 108 and exiting the vehicle 102 from a vehicle door opposite to the passenger door 118 may not view the passenger door location on respective user device, as the object/motorist 114 may be approaching towards the passenger door 118 and not the opposite vehicle door. On the other hand, if the motorist 114 may be approaching the driver door 116, the driver AR glasses 110 may output the driver door location, so that the driver 106 may know about the approach of the motorist 114 towards the driver door 116.

Figure 5:
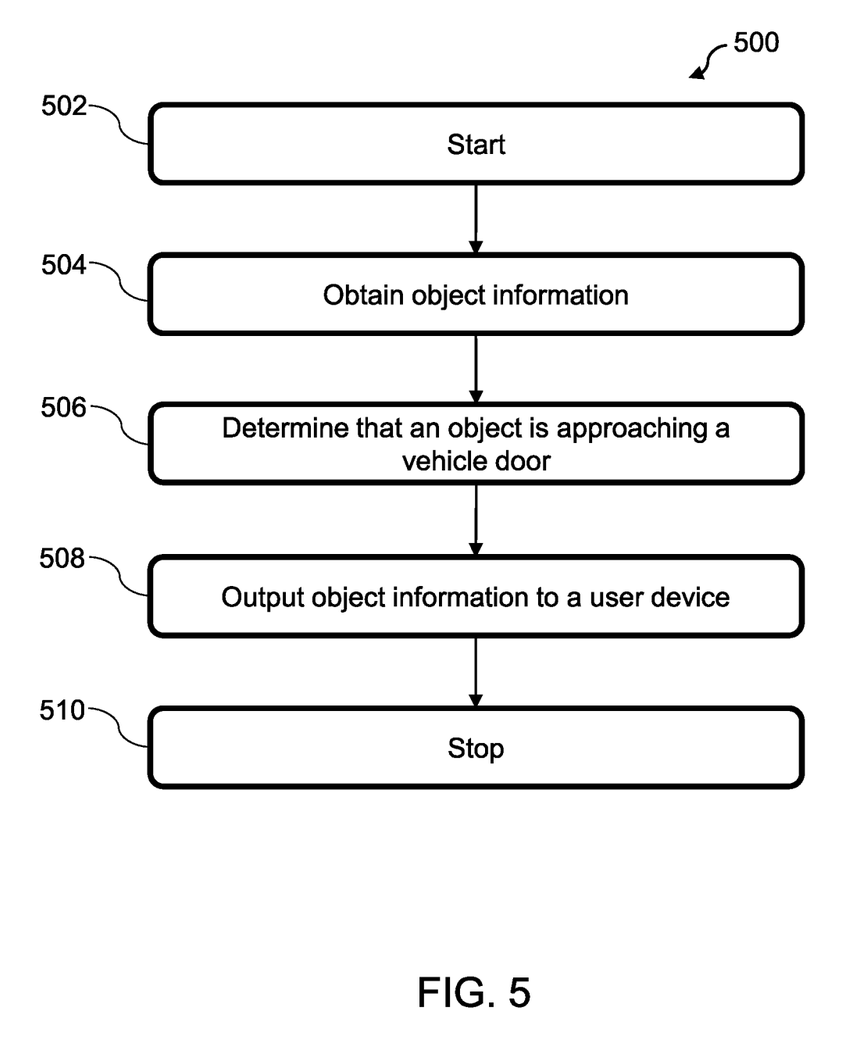
FIG. 5 depicts a flow diagram of an example method to facilitate vehicle users to exit from a vehicle in accordance with the present disclosure.

FIG. 5 depicts a flow diagram of an example method 500 to facilitate vehicle users to exit from the vehicle 102 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the vehicle processor 216, the object information from the detection unit 210 when the detection unit 210 detects the object presence in proximity to the vehicle 102. At step 506, the method 500 may include determining, by the vehicle processor 216, that the object/motorist 114 may be approaching towards the passenger door 118 based on the object information. At step 508, the method 500 may include outputting, by the vehicle processor 216, the object information to the user device 202 responsive to determining that the object/motorist 114 may be approaching towards the passenger door 118.

As described above, responsive to obtaining the object information from the vehicle 102/vehicle processor 216, the user device 202 may determine and output the passenger door location for the passenger 108. The passenger 108 may view/hear the notification including the passenger door location and may accordingly decide not to open the passenger door 118 till the motorist 114 crosses the passenger door 118.

The method 500 ends at step 510.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A user device comprising:
  a communication module configured to receive object information from a vehicle, wherein the communication module receives the object information indicative that an object is likely to pass the vehicle within a predetermined distance of the vehicle; and
  a device processor communicatively coupled with the communication module, wherein the device processor is configured to:
    obtain the object information from the communication module;
    determine a vehicle door location associated with a vehicle door in a vehicle interior portion based on the object information; and
    output an alert overlay of the vehicle door at the vehicle door location to indicate that the object is approaching towards the vehicle door,
  wherein the user device is Augmented Reality (AR) eyeglasses;

a display screen, wherein the device processor presents the alert overlay of the vehicle door on the display screen;

a device memory configured to store a vehicle interior portion 3-Dimensional (3D) image, wherein the communication module is further configured to communicatively couple the user device with the vehicle when the user device is located in the vehicle interior portion, wherein the device processor is further configured to:

obtain the vehicle interior portion 3D image from the device memory when the user device communicatively couples with the vehicle;

align a user device coordinate system with a vehicle interior portion coordinate system based on the vehicle interior portion 3D image;

determine a user device location in the vehicle interior portion based on the alignment; and     present the alert overlay of the vehicle door on the display screen based on the vehicle door location and the user device location.

2. The user device of claim 1, wherein the object information comprises at least one of an object location in proximity to the vehicle, an object movement speed, an object movement direction, or an object image.

3. The user device of claim 1, wherein the device processor is further configured to illuminate the alert overlay of the vehicle door in a predefined pattern based on the object information.

4. The user device of claim 1, wherein the device processor is further configured to include a digital image of the object in the alert based on the object information.

5. The user device of claim 1 further comprising a speaker, wherein the device processor outputs an audible signal output from a speaker of the user device indicative of the object.

* * * * *